US008893296B2

(12) United States Patent
Dumais et al.

(10) Patent No.: US 8,893,296 B2
(45) Date of Patent: Nov. 18, 2014

(54) MOBILE WIRELESS COMMUNICATIONS DEVICE FOR VALIDATING ACCESS TO AN APPLICATION BASED UPON A VALIDATION REQUEST AND RELATED METHODS

(75) Inventors: Paul Mark Joseph Dumais, Nepean (CA); Raymond Lee Canton, Ottawa (CA); Kimberly Chaila Horne, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/641,367

(22) PCT Filed: Jan. 7, 2011

(86) PCT No.: PCT/CA2011/000010
§ 371 (c)(1),
(2), (4) Date: Dec. 20, 2012

(87) PCT Pub. No.: WO2011/127555
PCT Pub. Date: Oct. 20, 2011

(65) Prior Publication Data
US 2013/0091585 A1 Apr. 11, 2013

Related U.S. Application Data

(60) Provisional application No. 61/324,686, filed on Apr. 15, 2010.

(51) Int. Cl.
*H04L 29/06* (2006.01)
*H04W 12/08* (2009.01)
*H04W 4/12* (2009.01)
(52) U.S. Cl.
CPC ........... *H04W 12/08* (2013.01); *H04L 65/1073* (2013.01); *H04L 63/083* (2013.01); *H04L 63/126* (2013.01); *H04W 4/12* (2013.01)
USPC .............................. 726/27; 455/466; 709/206

(58) Field of Classification Search
CPC ............................ G06F 21/40; H04L 65/1073
USPC .......................................................... 726/27
See application file for complete search history.

(56) References Cited

U.S. PATENT DOCUMENTS 7,210,166 B2   4/2007 Davis et al.
7,454,195 B2   11/2008 Lewis et al.
(Continued)

FOREIGN PATENT DOCUMENTS

JP   2008269381   11/2008
WO   2006081367   8/2006

OTHER PUBLICATIONS

Timothy W Van Der Horst et al: "Simple Authentication for the Web", Security and Privacy in Communications Networks and the Workshops, 2007. Securecomm 2007. Third International Conference on, IEEE, Sep. 17, 2007, pp. 473-482.

(Continued)

*Primary Examiner* — Hadi Armouche
*Assistant Examiner* — Bryan Wright
(74) *Attorney, Agent, or Firm* — Allen, Dyer, Doppelt, Milbrath & Gilchrist, P.A.

(57) ABSTRACT

A mobile wireless communications device may include a wireless transceiver and a controller coupled to the wireless transceiver. The controller may be configured to determine if an email address is associated with the mobile wireless communications device. The controller may further be configured to wirelessly send a validation request to a validation server based upon the email address, and wait for a validation email to be wirelessly received from the validation server based upon the validation request if the email address is associated with the wireless communications device, and if the validation email is wirelessly received, then validate access an application based upon the validation email.

28 Claims, 8 Drawing Sheets

(56) References Cited

U.S. PATENT DOCUMENTS

| | | |
|---|---|---|
| 7,603,435 B2 | 10/2009 | Welingkar et al. |
| 2003/0200265 A1* | 10/2003 | Henry .......................... 709/206 |
| 2005/0138390 A1 | 6/2005 | Adams et al. |
| 2006/0085845 A1* | 4/2006 | Davis et al. ....................... 726/6 |
| 2008/0028446 A1 | 1/2008 | Burgoyne |
| 2008/0115141 A1 | 5/2008 | Welingkar et al. |
| 2008/0115226 A1* | 5/2008 | Welingkar et al. .............. 726/28 |
| 2009/0132813 A1 | 5/2009 | Schibuk |
| 2010/0082674 A1 | 4/2010 | Yiu et al. |
| 2010/0114776 A1 | 5/2010 | Weller et al. |
| 2010/0248699 A1* | 9/2010 | Dumais ...................... 455/414.1 |
| 2011/0214173 A1* | 9/2011 | Kamel et al. ...................... 726/9 |
| 2011/0250909 A1* | 10/2011 | Mathias et al. ............... 455/466 |

OTHER PUBLICATIONS

Internet Explorer Password Recovery and Unmask Tool, Internet Location: www.passwordrecovery.in/password-recovery/internet-explorer.asp, Dec. 2010, pp. 1-2.

Brothersoft.com, Email Password Recovery 3.0.1.5, 2009, pp. 1-3.

* cited by examiner

US 8,893,296 B2

MOBILE WIRELESS COMMUNICATIONS DEVICE FOR VALIDATING ACCESS TO AN APPLICATION BASED UPON A VALIDATION REQUEST AND RELATED METHODS

RELATED APPLICATION

The present application is based upon previously filed copending U.S. provisional application Ser. No. 61/324,686, filed Apr. 15, 2010, the entire subject matter of which is incorporated by reference in its entirety.

TECHNICAL FIELD

The present disclosure relates to the field of wireless communications, and, more particularly, to mobile wireless communications devices with validation and related methods.

BACKGROUND

Many applications, for example, financial applications and email applications, may include user authentication via a username and password to access the application. A user desiring access to an application requiring user authentication may find it increasingly difficult to manage a respective password for a corresponding username. For example, the user may forget a username and/or password.

Where a user forgets her password for an application, the password may be recovered by performing a password recovery process. The password recovery process is often lengthy and includes multiple steps to be performed by the user.

For example, at an online store, a user may recover a password by entering the user's email address into the online store's web page. The corresponding password, or a temporary password to be reset, is emailed to the user from the online store.

In a messaging service application for a wireless device, when a user attempts to recover a corresponding contact list, for example, by selecting the menu command Restore Contacts, the application attempts to match an email address associated with or on the wireless device with an email address identifier associated with a contact list stored on a messaging service server. If there is a match, the application restores the corresponding contact list on the wireless device.

The Internet Explorer Password Recovery and Unmask Tool application is an application that recovers forgotten passwords. More particularly, the Internet Explorer Password Recovery and Windows Application password unmask tool application recovers Internet Explorer saved passwords, for example, passwords for lost or forgotten email accounts, newspaper groups, online shopping web sites, magazine subscriptions, web forms, billing addresses, search engine accounts, or any password protected Windows application.

DETAILED DESCRIPTION

Figure 1:
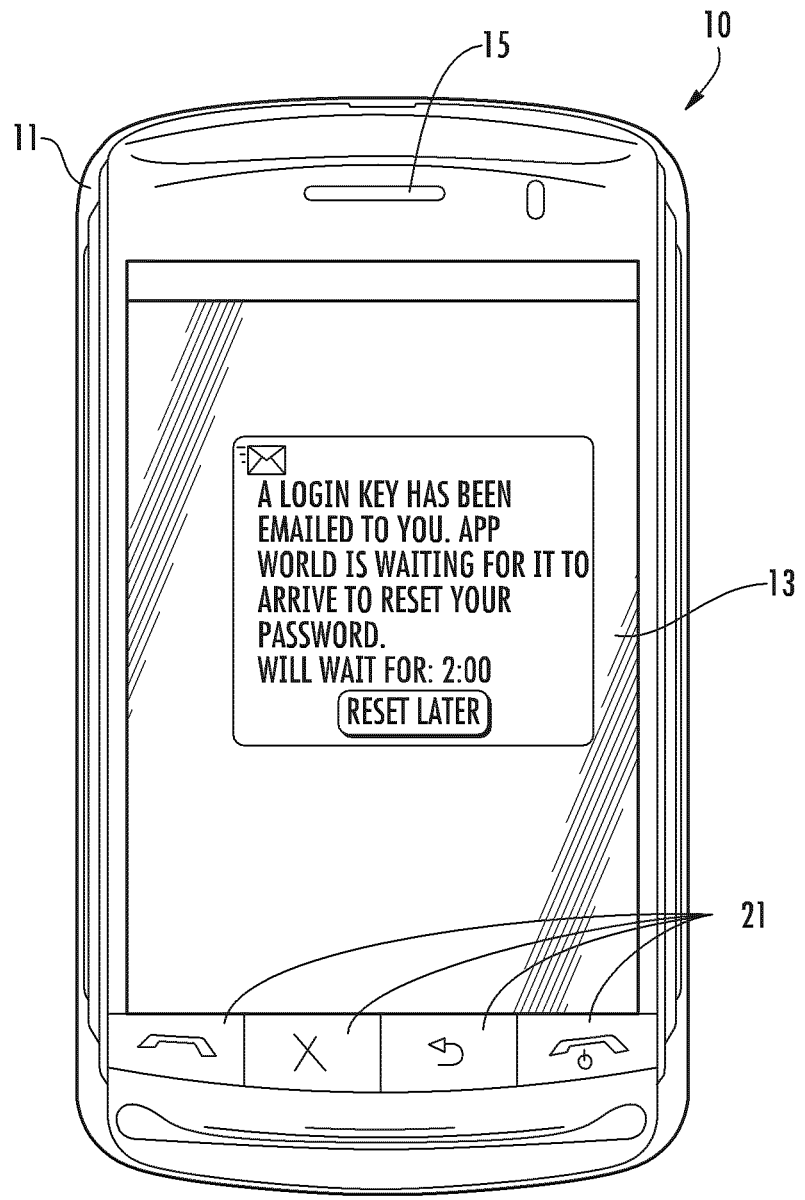
FIG. 1 is a plan view of a mobile wireless communications device illustrating validation in accordance with an example embodiment of the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In accordance with one example aspect, a mobile wireless communications device may include a housing and a wireless transceiver carried by the housing. The mobile wireless communications device may also include a controller carried by the housing and coupled to the wireless transceiver. The controller (also referred to herein as a processor) may be configured to determine if an email address is associated with the mobile wireless communications device. The controller may also be configured to wirelessly send a validation request to a validation server based upon the email address. The controller may also be configured to wait for a validation email to be wirelessly received from the validation server based upon the validation request if the email address is associated with the wireless communications device. If the validation email is wirelessly received, then the controller may validate an application based upon the validation email. Accordingly, the time and effort for recovering a password in an application having a username and/or password may be reduced.

The controller may be configured to discontinue waiting for the validation email, if the validation email is not wirelessly received within a predetermined time. The controller may be configured to discontinue waiting for receipt for validation email, if the validation email is not wirelessly received prior to a user-input override.

The validation email may include a unique login key. The controller may be configured to extract the unique login key from the validation email. The controller may be configured to validate the application based upon wirelessly sending the unique login key back to the validation server.

The mobile wireless communications device may also include a display coupled to the controller. The controller may be configured to wirelessly receive a notification message from the validation server that the validation email has been wirelessly sent and to display the notification message on the display. The controller may be configured to display a password reset input screen based upon the validation email.

A method aspect may be directed to a method of validating an application on a mobile wireless communications device. The method may include determining if an email address is associated with the mobile wireless communications device, for example. The method may further include wirelessly sending a validation request to a validation server based upon the email address. The method may further include waiting for a validation email to be wirelessly received from the validation server based upon the validation request if the email address is associated with the wireless communications device, and if the validation email is wirelessly received, then validate the application based upon the validation email, for example.

Figure 2:
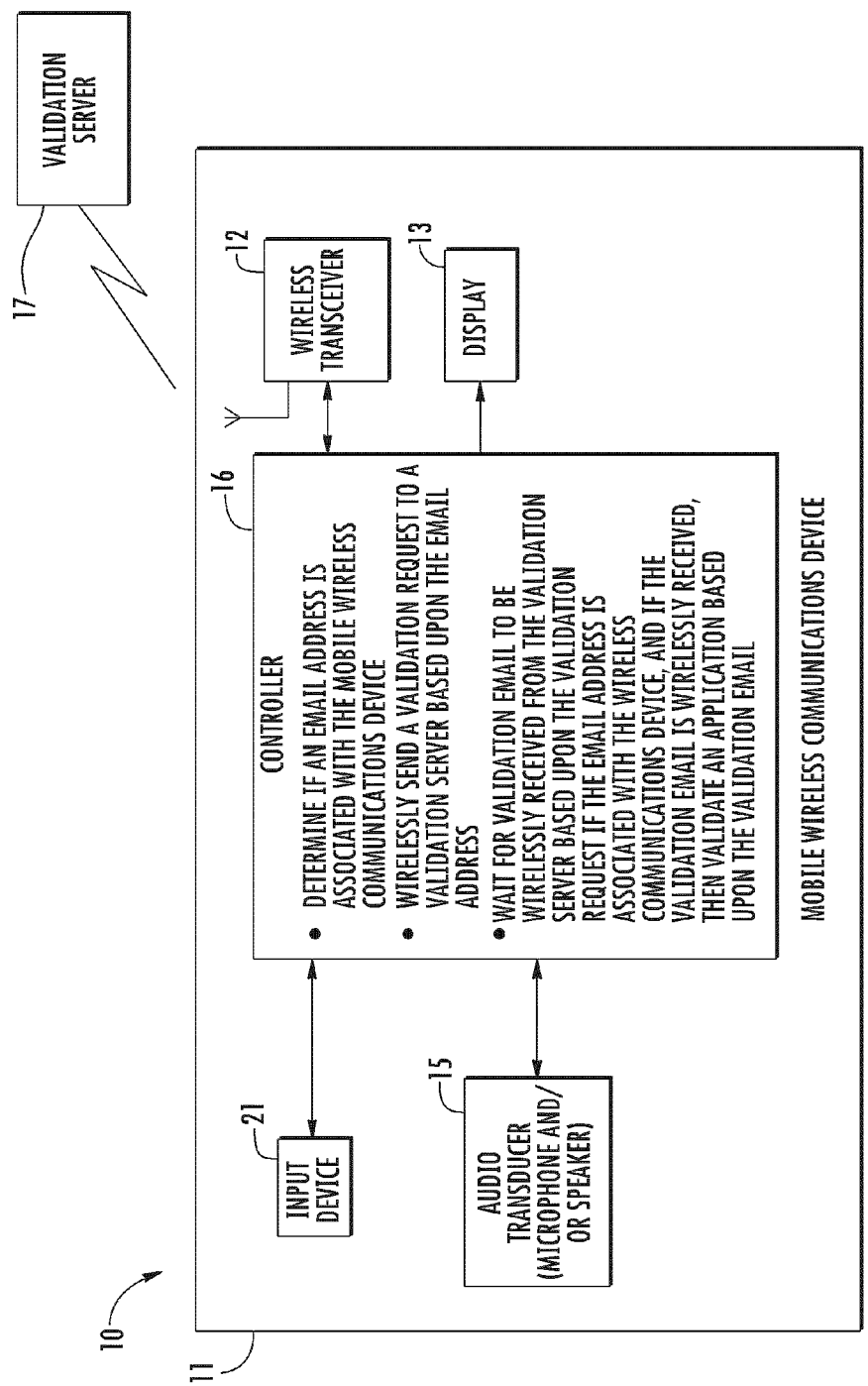
FIG. 2 is a schematic block diagram of the mobile wireless communications device of FIG. 1 and a validation server, according to an example embodiment.

Referring initially to FIGS. 1 and 2, a mobile wireless communications device 10 illustratively includes a housing 11, a wireless transceiver 12 carried by the housing, and a display 13 carried by the housing.

The mobile wireless communications device 10 also illustratively includes an audio transducer 15 carried by the housing 11. The audio transducer 15 may be a microphone, for example. The audio transducer 15 may also be a speaker. In some example embodiments, there may be more than one audio transducer 15, for example, a microphone and speaker may be used and carried by the housing 11.

The mobile wireless communications device 10 includes one or more input devices 21. The input devices 21 illustratively include push buttons for cooperating with a controller 16. In some example embodiments, the input device 21 may be an alphanumeric keypad or other input device for cooperating with the controller 16, for example. Still further, an input device 21 may be coupled to the display 13 to accept a touching input therefrom and cooperate with the controller 16, for example.

The controller 16 is also carried by the housing 11 and cooperates with the wireless transceiver 12 to perform at least one mobile wireless communications function. For example, the wireless transceiver 12 may be a cellular transceiver or a WiFi transceiver, for example, and may cooperate with the controller 16 to communicate data and/or voice communications. Other types of wireless transceivers and mobile wireless communications functions will be appreciated by those skilled in the art.

The controller 16 is configured to determine if an email address is associated with the mobile wireless communications device 10. The controller 16 is also configured to wirelessly send a validation request to a validation server based upon the email address. The controller 16 is further configured to wait for a validation email to be wirelessly received from the validation server 17 based upon the validation request if the email address is associated with the wireless communications device, and if the validation email is wirelessly received, then validate an application based upon the validation email. This usefully reduces the time and effort for password recovery, for example.

Figure 3:
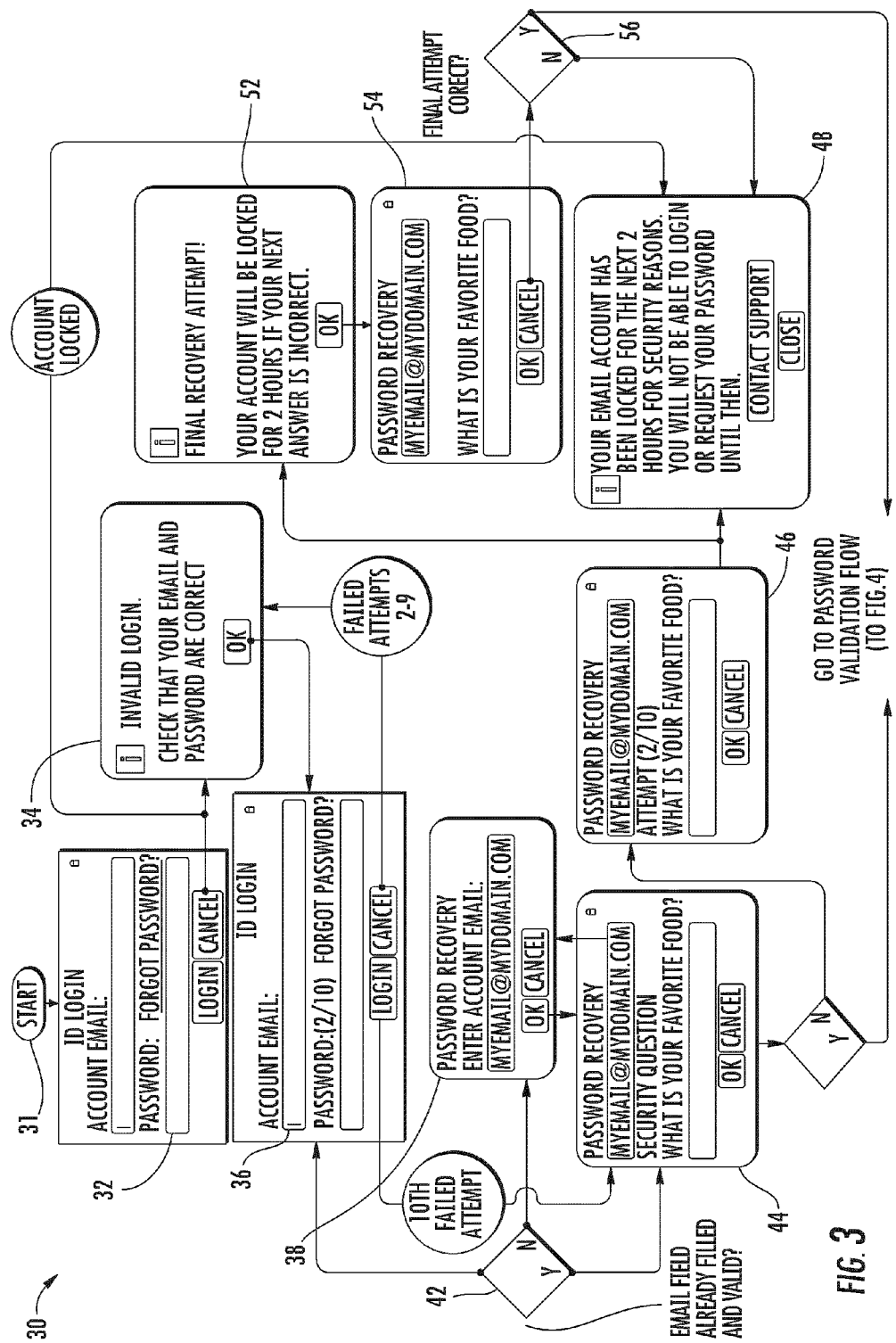
FIG. 3 is a flow diagram of operation of the controller of FIG. 2, according to an example embodiment.

Referring now additionally to the flow chart 30 of FIG. 3, beginning at Block 31, operation of the controller 16 with regard to the validating the application is described by way of screen shots of the display 13. The controller 16 is configured to prompt a user for a username that is an email address and password associated with an application account on the display 13 (Block 32). The user provides the email address and password via the input device 21. If the user is able to provide the corresponding email address and password associated with the application account, access to the application account is granted (not shown).

If the user's attempt to access the application account has failed, for example, by providing an incorrect password to the corresponding email account, the controller 16 informs the user of an invalid login (Block 34) and prompts the user to provide the email address and password again (Block 36). The controller 16 allows the user a threshold number of failed attempts to enter the email address and password, for example, ten. Of course, another threshold number may be selected.

Alternatively, if the user recognizes that the correct password has been forgotten, the user may provide input by way of a display link, for example, indicative of a forgotten password. Based upon the input, the controller 16 prompts the user to enter the email address to recover the corresponding password (Block 38). Of course, the user may follow the forgotten password link after a number of unsuccessful attempts. In this case, the controller 16 determines if the email address previously entered by the user is valid (Block 42) and the controller does not display the prompt to enter the email address to recover the corresponding password.

After the threshold number of attempts to enter the email address and password has been exceeded, or after the user entered the email account after indicating a forgotten password, the controller 16 may prompt the user with a security question, for example, the user's favorite food (Block 44). Other security questions may be asked, as will be appreciated by those skilled in the art. The controller 16 usefully allows the user another threshold number of failed attempts to enter the correct answer to the security question, for example, ten (Block 46). Of course, another threshold number may be selected.

If the user does not answer the security question correctly, the controller 16 usefully locks the mobile wireless communications device 10 for a period of time, for example, two hours (Block 48). The controller 16 may display a link for the user to contact support. Other time periods may be selected. Additionally, the controller 16 may display a warning to the user of an impending lock (Block 52) when prompting the user for a final attempt (Block 54). If the final attempt is incorrect (Block 56), the controller 16 locks the mobile wireless communications device 10 (Block 48).

Figure 4:
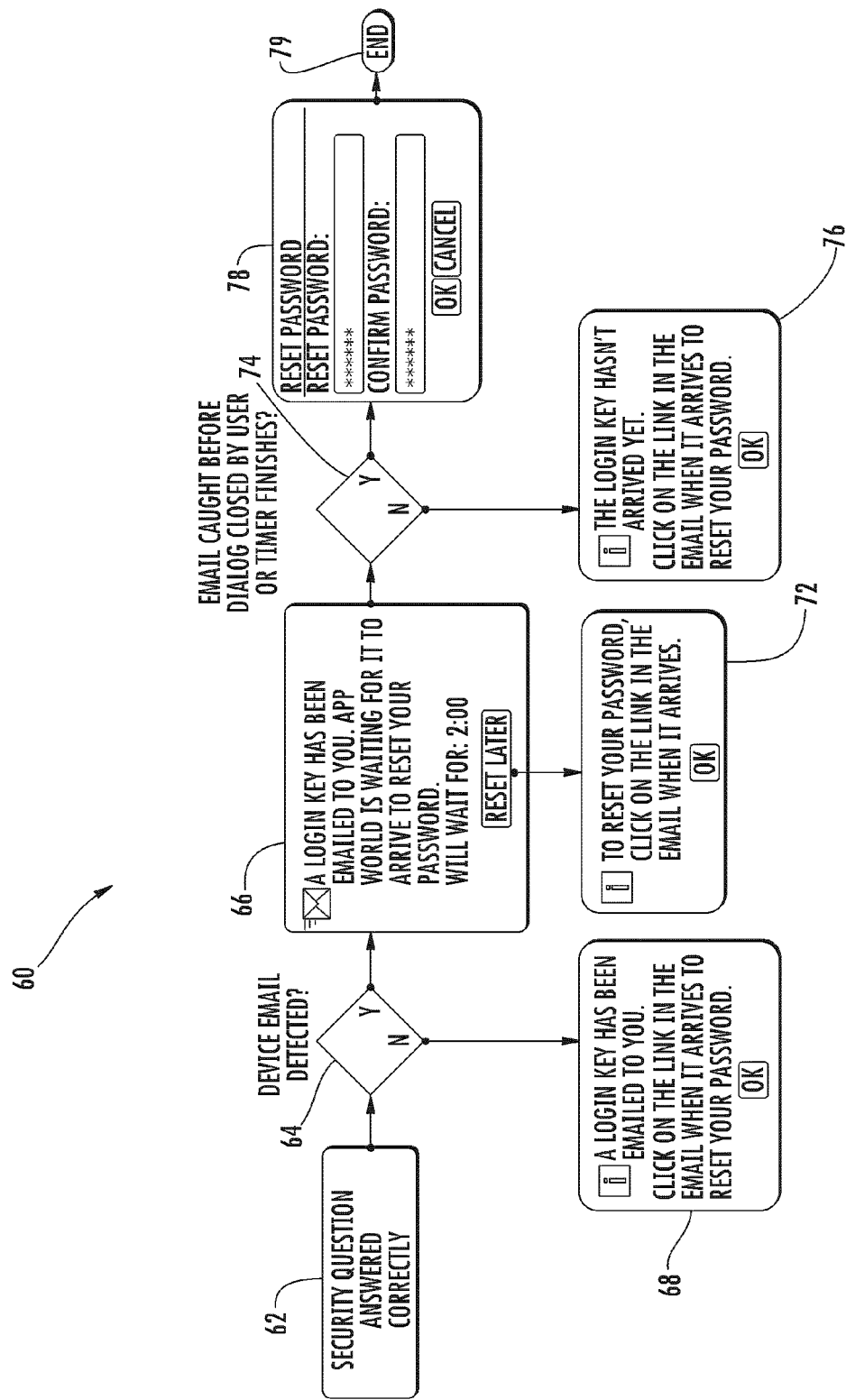
FIG. 4 is another flow diagram of operation of the controller of FIG. 2, according to an example embodiment.

Referring now additionally to the flowchart 60 of FIG. 4, if the user provides a correct response to the security question (Block 62), the controller 16 determines if the email account entered by the user is associated with the mobile wireless communications device 10 (Block 64). In other words, the controller 16 attempts to match the user entered email address with an email address setup in the mobile wireless device. For example, if the user entered myemail@mydomain.com and the mobile wireless communications device 10 is setup to receive email from myemail@mydomain.com, then the email address is associated with the mobile wireless communications device.

If the email address is associated with the mobile wireless communications device 10, the controller 16 cooperates with the wireless transceiver 12 and wirelessly sends a validation request to a validation server 17 based upon the email address. The validation server 17 receives the validation request and generates and sends a validation email based upon the validation request. The validation server 17 may send a notification message to the controller 16 that the validation email has been sent. The controller 16 wirelessly receives the notification message and displays a corresponding message to the user (Block 66). The controller 16 waits for the validation email to be wirelessly received from the validation server 17.

If the controller 16 cannot associate the email address with the mobile wireless communications device 10 (Block 64), the controller displays a message informing the user that a validation email including a login key has been sent to the email address entered by the user, and that the user must follow the link in the validation email when it is received at the email account (Block 68). The controller 16 may not be able to associate the email if, for example, a user has an email address setup to forward to another email address that is associated with the mobile wireless communications device 10. In other words, to access the un-associated email account, a user may have to access the email account from another device, or through an email client.

While waiting for the validation email for the associated email address (Block 66) to be wirelessly received, the controller 16 starts a countdown timer for receipt of the validation email. The countdown timer is set for a predetermined time, for example, two minutes as illustrated, but as will be appreciated by those skilled in the art, can be set for any amount of time. The controller 16 is configured to discontinue waiting for the validation email if the validation email is not received within the predetermined time (Block 74). In other words, the controller 16 may discontinue waiting for the validation email if it is not received prior to the expiration of the countdown timer (Block 76).

Alternatively, the controller 16 is configured to discontinue waiting for the validation email if the validation email is not received prior to a user-input override. For example, if the user does not wish to wait for the validation email to arrive, the user may press a "reset later" button to discontinue waiting for the validation email. If the controller 16 discontinues waiting based upon the user-input override, the controller displays a dialog informing the user to follow the password reset instructions in the validation email when it wirelessly arrives at the mobile wireless communications device 10 (Block 72).

The controller 16 continues to display that it is waiting for the validation email for a minimum time, for example ten seconds, even if the validation email has been received. This usefully allows the user to follow the status of the sent validation request and validation email. Of course, other times may be selected.

If the validation email has wirelessly arrived at the mobile wireless communications device 10 prior to either the expiration of the predetermined time (Block 74) and the user-input override has not been input, the controller 16 extracts a unique login key from the validation email. More particularly, the controller 16 determines the sender email address of each incoming email to first determine if a received email is the validation email. If the sender of a received email matches a predetermined sender email address, for example, a sender email address associated with the validation server 17, the email is considered the validation email. The controller 16 parses the body of the validation email to extract a hyperlink including the unique login key.

The unique login key is a unique token associated with the given validation (password reset) request to verify the validation request. The controller 16 uses the extracted unique login key to access, via another application programming interface, for example, the validation server 17 and acknowledges receipt of the validation email to validate the application.

The controller 16 displays a password reset input screen based upon the validation email (Block 78). A user inputs a new password and confirms the password at the password reset input screen. The controller 16 may optionally wirelessly send the new password to the validation server to notify it of the password change for future validation, for example, before ending at Block 79. Accordingly, the time and number of steps, for a user to recover a password and reset the password may be reduced.

It is noted that FIGS. 3 and 4 are flow diagrams corresponding to example embodiments. Some of the steps illustrated in the flow diagrams may be performed in an order other than that which is described. Also, as will be appreciated, not all of the steps described in the flow diagrams are required to be performed, additional steps may be added, and some of the illustrated steps may be substituted with other steps.

The embodiments described herein generally relate to a mobile wireless communication device, hereafter referred to as a mobile wireless communications device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smartphones, wireless organizers, personal digital assistants, computers, laptops, handheld wireless communication devices, wirelessly enabled notebook computers, and the like.

The mobile wireless communications device is a two-way communication device with advanced data communication capabilities including the capability to communicate with other mobile wireless communications devices or computer systems through a network of transceiver stations. The mobile wireless communications device may also have the capability to allow voice communication. Depending on the functionality provided by the mobile wireless communications device, it may be referred to as a data messaging device, a two-way pager, a cellular telephone with data messaging capabilities, a wireless Internet appliance, or a data communication device (with or without telephony capabilities). To aid the reader in understanding the structure of the mobile wireless communications device and how it communicates with other devices and host systems, reference will now be made to FIGS. 5 through 8.

Figure 5:
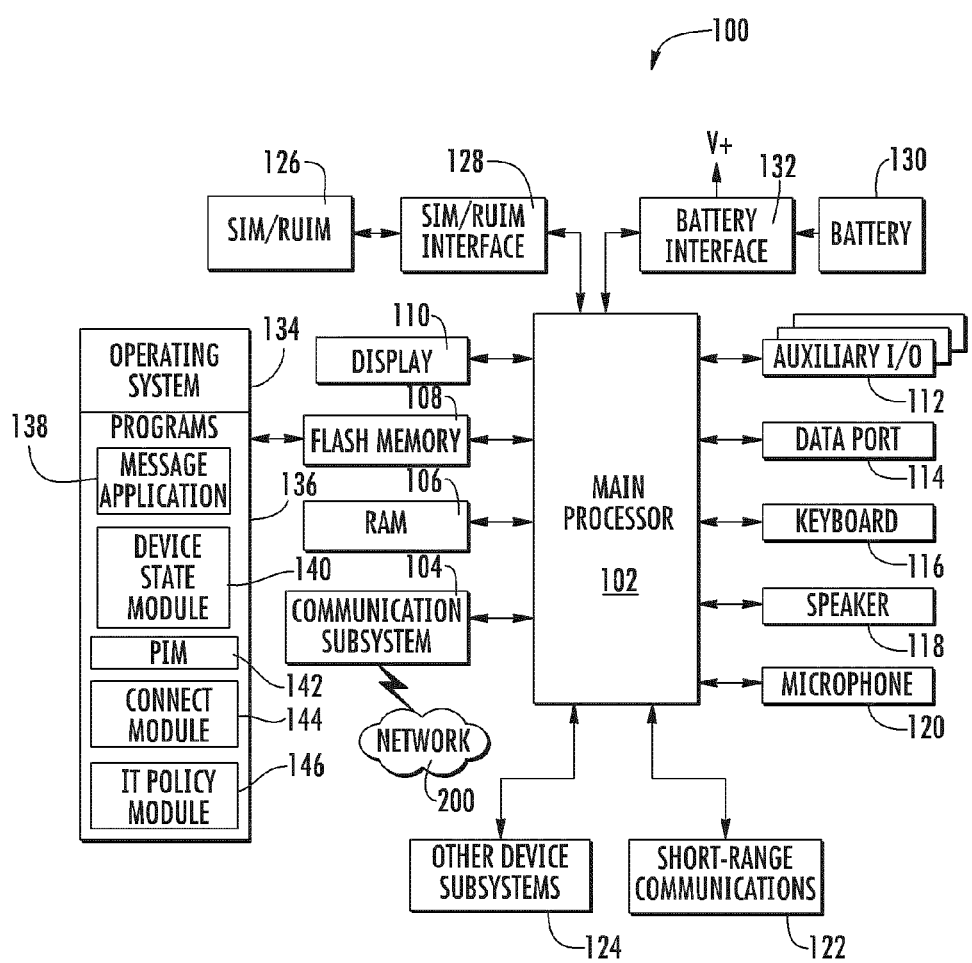
FIG. 5 is a block diagram of another example embodiment of a mobile wireless communications device.

Referring first to FIG. 5, shown therein is a block diagram of another example embodiment of a mobile wireless communications device 100. The mobile wireless communications device 100 includes a number of components such as a main processor 102 that controls the overall operation of the mobile wireless communications device 100. Communication functions, including data and voice communications, are performed through a communication subsystem 104. The communication subsystem 104 receives messages from and sends messages to a wireless network 200. In this example embodiment of the mobile wireless communications device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile wireless communications device 100 is a GSM/GPRS wireless network in one example implementation, other wireless networks may also be associated with the mobile wireless communications device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile wireless communications device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile wireless communications device 100 can send and receive communication signals over the wireless network 200 after required network registration or activation procedures have been completed. Network access is associated with a subscriber or user of the mobile wireless communications device 100. To identify a subscriber, the mobile wireless communications device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile wireless communications device 100 and to personalize the mobile wireless communications device 100, among other things. Without the SIM card 126, the mobile wireless communications device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile wireless communications device. The SIM card/RUIM 126 may store additional subscriber information for a mobile wireless communications device as well, including datebook (or calendar) information and recent call information. Alternatively, user identification information can also be programmed into the flash memory 108.

The mobile wireless communications device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile wireless communications device 100. Although current technology makes use of a battery, future technologies such as micro fuel cells may provide the power to the mobile wireless communications device 100.

The mobile wireless communications device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile wireless communications device 100 during its manufacture. Other software applications include a message application 138 that can be any suitable software program that allows a user of the mobile wireless communications device 100 to send and receive electronic messages. Various alternatives exist for the message application 138 as is well known to those skilled in the art. Messages that have been sent or received by the user are typically stored in the flash memory 108 of the mobile wireless communications device 100 or some other suitable storage element in the mobile wireless communications device 100. In at least some embodiments, some of the sent and received messages may be stored remotely from the device 100 such as in a data store of an associated host system that the mobile wireless communications device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile wireless communications device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile wireless communications device subscriber's corresponding data items stored and/or associated with a host computer system. This functionality creates a mirrored host computer on the mobile wireless communications device 100 with respect to such items. This can be particularly advantageous when the host computer system is the mobile wireless communications device subscriber's office computer system.

The mobile wireless communications device 100 also includes a connect module 144, and an IT policy module 146. The connect module 144 implements the communication protocols that are required for the mobile wireless communications device 100 to communicate with the wireless infrastructure and any host system, such as an enterprise system, that the mobile wireless communications device 100 is authorized to interface with. Examples of a wireless infrastructure and an enterprise system are given in FIGS. 7 and 8, which are described in more detail below.

The connect module 144 includes a set of APIs that can be integrated with the mobile wireless communications device 100 to allow the mobile wireless communications device 100 to use any number of services associated with the enterprise system. The connect module 144 allows the mobile wireless communications device 100 to establish an end-to-end secure, authenticated communication pipe with the host system. A subset of applications for which access is provided by the connect module 144 can be used to pass IT policy commands from the host system to the mobile wireless communications device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile wireless communications device 100. The IT policy data can then be stored in the flash memory 106 in its native form. After the IT policy data is stored, a global notification can be sent by the IT policy module 146 to all of the applications residing on the mobile wireless communications device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile wireless communications device 100. These software applications can be third party applications, which are added after the manufacture of the mobile wireless communications device 100. Examples of third party applications include games, calculators, utilities, etc.

The additional applications can be loaded onto the mobile wireless communications device 100 through at least one of the wireless network 200, the auxiliary I/O subsystem 112, the data port 114, the short-range communications subsystem 122, or any other suitable device subsystem 124. This flexibility in application installation increases the functionality of the mobile wireless communications device 100 and may provide enhanced on-device functions, communication-related functions, or both. For example, secure communication applications may enable electronic commerce functions and other such financial transactions to be performed using the mobile wireless communications device 100.

The data port 114 enables a subscriber to set preferences through an external device or software application and extends the capabilities of the mobile wireless communications device 100 by providing for information or software downloads to the mobile wireless communications device 100 other than through a wireless communication network. The alternate download path may, for example, be used to load an encryption key onto the mobile wireless communications device 100 through a direct and thus reliable and trusted connection to provide secure device communication.

The data port 114 can be any suitable port that enables data communication between the mobile wireless communications device 100 and another computing device. The data port 114 can be a serial or a parallel port. In some instances, the data port 114 can be a USB port that includes data lines for data transfer and a supply line that can provide a charging current to charge the battery 130 of the mobile wireless communications device 100.

The short-range communications subsystem 122 provides for communication between the mobile wireless communications device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile wireless communications device 100 is substantially similar, except that the received signals are output to the speaker 118, and signals for transmission are generated by the microphone 120. Alternative voice or audio I/O subsystems, such as a voice message recording subsystem, can also be implemented on the mobile wireless communications device 100. Although voice or audio signal output is accomplished primarily through the speaker 118, the display 110 can also be used to provide additional information such as the identity of a calling party, duration of a voice call, or other voice call related information.

Figure 6:
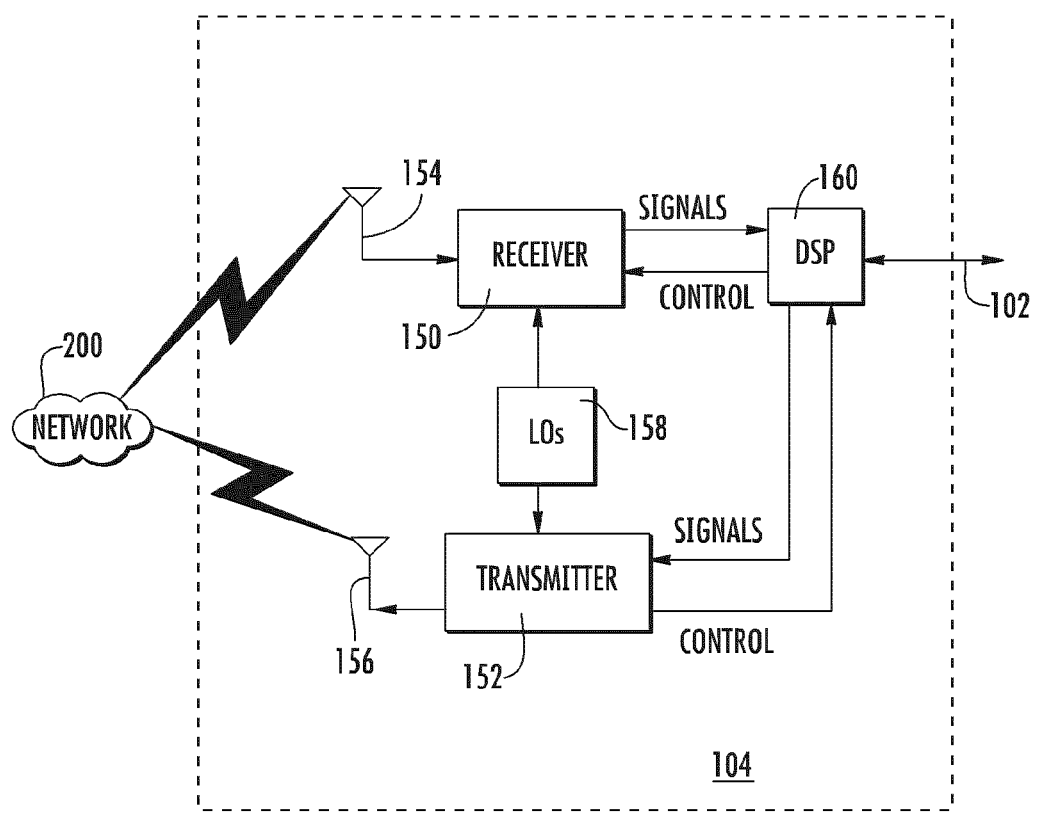
FIG. 6 is a block diagram of an example embodiment of a communication subsystem component of the mobile wireless communications device of FIG. 5.

Referring now to FIG. 6, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile wireless communications device 100 is intended to operate. Thus, it should be understood that the design illustrated in FIG. 6 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile wireless communications device 100 and the wireless network 200 can contain one or more different channels, typically different RF channels, and associated protocols used between the mobile wireless communications device 100 and the wireless network 200. An RF channel is a limited resource that must be conserved, typically due to limits in overall bandwidth and limited battery power of the mobile wireless communications device 100.

When the mobile wireless communications device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 7:
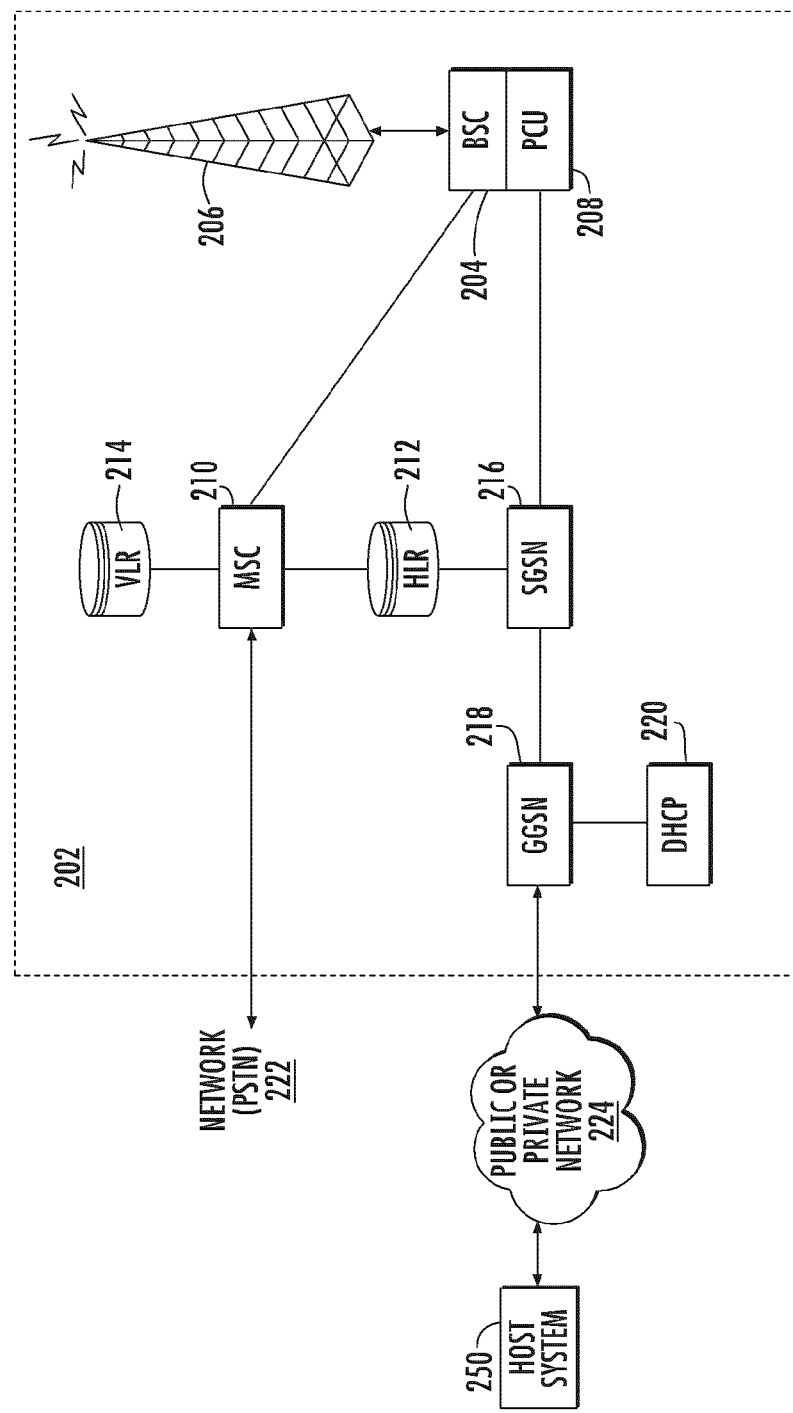
FIG. 7 is an example block diagram of a node of a wireless network.

Referring now to FIG. 7, a block diagram of an example implementation of a node 202 of the wireless network 200 is shown. In practice, the wireless network 200 comprises one or more nodes 202. In conjunction with the connect module 144, the mobile wireless communications device 100 can communicate with the node 202 within the wireless network 200. In the example implementation of FIG. 7, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile wireless communications devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile wireless communications device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile wireless communications devices within its cell via the station 206. The fixed transceiver equipment normally performs such functions as modulation and possibly encoding and/or encryption of signals to be transmitted to the mobile wireless communications device 100 in accordance with particular, usually predetermined, communication protocols and parameters, under control of its controller. The fixed transceiver equipment similarly demodulates and possibly decodes and decrypts, if necessary, any communication signals received from the mobile wireless communications device 100 within its cell. Communication protocols and parameters may vary between different nodes. For example, one node may employ a different modulation scheme and operate at different frequencies than other nodes.

For all mobile wireless communications devices 100 registered with a specific network, permanent configuration data such as a user profile is stored in the HLR 212. The HLR 212 also contains location information for each registered mobile wireless communications device and can be queried to determine the current location of a mobile wireless communications device. The MSC 210 is responsible for a group of location areas and stores the data of the mobile wireless communications devices currently in its area of responsibility in the VLR 214. Further, the VLR 214 also contains information on mobile wireless communications devices that are visiting other networks. The information in the VLR 214 includes part of the permanent mobile wireless communications device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile wireless communications device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile wireless communications device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile wireless communications device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile wireless communications device 100 must be assigned to one or more APNs and mobile wireless communications devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile wireless communications device 100 is not using its PDP Context, the PDP Context can be de-allocated and the IP address returned to the IP address pool managed by the DHCP server 220.

Figure 8:
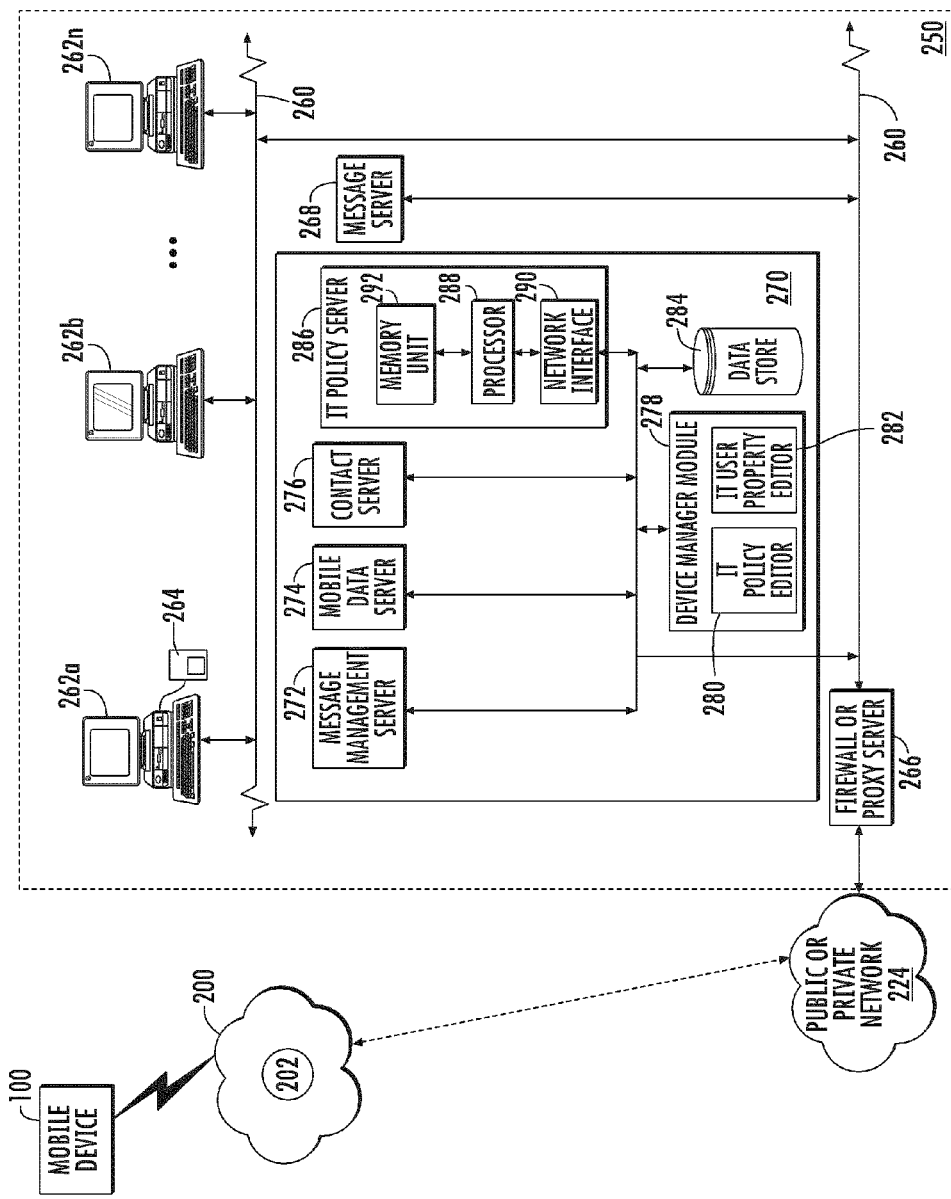
FIG. 8 is a block diagram of a host system in one example configuration for use with the wireless network of FIG. 6 and the mobile wireless communications device of FIG. 5.

Referring now to FIG. 8, shown therein is a block diagram illustrating components of an example configuration of a host system 250 that the mobile wireless communications device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile wireless communications device 100 belongs. Typically, a plurality of mobile wireless communications devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's mobile wireless communications device 100 is situated on a LAN connection. The cradle 264 for the mobile wireless communications device 100 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g. PIM data, private symmetric encryption keys to facilitate secure communications) from the user computer 262*a* to the mobile wireless communications device 100, and may be particularly useful for bulk information updates often performed in initializing the mobile wireless communications device 100 for use. The information downloaded to the mobile wireless communications device 100 may include certificates used in the exchange of messages.

It will be understood by persons skilled in the art that the user computers 262*a*-262*n* will typically also be connected to other peripheral devices, such as printers, etc. which are not explicitly shown in FIG. 4. Furthermore, only a subset of network components of the host system 250 are shown in FIG. 8 for ease of exposition, and it will be understood by persons skilled in the art that the host system 250 will comprise additional components that are not explicitly shown in FIG. 8 for this example configuration. More generally, the host system 250 may represent a smaller part of a larger network (not shown) of the organization, and may comprise different components and/or be arranged in different topologies than that shown in the example embodiment of FIG. 8.

To facilitate the operation of the mobile wireless communications device 100 and the wireless communication of messages and message-related data between the mobile wireless communications device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile wireless communications devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile wireless communications devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile wireless communications device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile wireless communications device 100. The wireless VPN router allows a VPN connection to be established directly through a specific wireless network to the mobile wireless communications device 100. The wireless VPN router can be used with the Internet Protocol (IP) Version 6 (IPV6) and IP-based wireless networks. This protocol can provide enough IP addresses so that each mobile wireless communications device has a dedicated IP address, making it possible to push information to a mobile wireless communications device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile wireless communications device 100 in this alternative implementation.

Messages intended for a user of the mobile wireless communications device 100 are initially received by a message server 268 of the host system 250. Such messages may originate from any number of sources. For instance, a message may have been sent by a sender from the computer 262*b* within the host system 250, from a different mobile wireless communications device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262*a* may request the e-mail messages associated with that user's account stored on the data store associated with the message server 268. These messages are then retrieved from the data store and stored locally on the computer 262*a*. The data store associated with the message server 268 can store copies of each message that is locally stored on the mobile wireless communications device 100. Alternatively, the data store associated with the message server 268 can store all of the messages for the user of the mobile wireless communications device 100 and only a smaller number of messages can be stored on the mobile wireless communications device 100 to conserve memory. For instance, the most recent messages (i.e. those received in the past two to three months for example) can be stored on the mobile wireless communications device 100.

When operating the mobile wireless communications device 100, the user may wish to have e-mail messages retrieved for delivery to the mobile wireless communications device 100. The message application 138 operating on the mobile wireless communications device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile wireless communications device 100 is assigned its own e-mail address, and messages addressed specifically to the mobile wireless communications device 100 are automatically redirected to the mobile wireless communications device 100 as they are received by the message server 268.

The message management server 272 can be used to specifically provide support for the management of messages, such as e-mail messages, that are to be handled by mobile wireless communications devices. Generally, while messages are still stored on the message server 268, the message management server 272 can be used to control when, if, and how messages are sent to the mobile wireless communications device 100. The message management server 272 also facilitates the handling of messages composed on the mobile wireless communications device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile wireless communications device 100. The message management server 272 may also compress and encrypt new messages (e.g. using an encryption technique such as Data Encryption Standard (DES), Triple DES, or Advanced Encryption Standard (AES)) and push them to the mobile wireless communications device 100 via the shared network infrastructure 224 and the wireless network 200. The message management server 272 may also receive messages composed on the mobile wireless communications device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile wireless communications device 100 can be defined (e.g. by an administrator in accordance with IT policy) and enforced by the message management server 272. These may include whether the mobile wireless communications device 100 may receive encrypted and/or signed messages, minimum encryption key sizes, whether outgoing messages must be encrypted and/or signed, and whether copies of all secure messages sent from the mobile wireless communications device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile wireless communications device 100. For example, in some cases, when a message is initially retrieved by the mobile wireless communications device 100 from the message server 268, the message management server 272 may push only the first part of a message to the mobile wireless communications device 100, with the part being of a pre-defined size (e.g. 2 KB). The user can then request that more of the message be delivered in similar-sized blocks by the message management server 272 to the mobile wireless communications device 100, possibly up to a maximum pre-defined message size. Accordingly, the message management server 272 facilitates better control over the type of data and the amount of data that is communicated to the mobile wireless communications device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile wireless communications device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile wireless communications devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile wireless communications devices 100. As mentioned, the IT administrator can use IT policy rules to define behaviors of certain applications on the mobile wireless communications device 100 that are permitted such as phone, web browser or Instant Messenger use. The IT policy rules can also be used to set specific values for configuration settings that an organization requires on the mobile wireless communications devices 100 such as auto signature text, WLAN/VoIP/VPN configuration, security requirements (e.g. encryption algorithms, password rules, etc.), specifying themes or applications that are allowed to run on the mobile wireless communications device 100, and the like.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

The invention claimed is:

1. A mobile wireless communications device comprising:
a wireless transceiver; and
a controller coupled to said wireless transceiver, said controller configured to determine, as part of a user-login process to the mobile wireless communications device, if an email address is associated with the mobile wireless communications device,
wirelessly send a validation request to a validation server based upon the email address, and
wait for a validation email to be wirelessly received from the validation server based upon the validation request if the email address is associated with the wireless communications device, and if the validation email is wirelessly received, then validate access to an application based upon the validation email.

2. The mobile wireless communications device according to claim 1, wherein said controller is configured to discontinue waiting for the validation email, if the validation email is not wirelessly received within a predetermined time.

3. The mobile wireless communications device according to claim 1, wherein said controller is configured to discontinue waiting for the validation email, if the validation email is not wirelessly received prior to a user-input override.

4. The mobile wireless communications device according to claim 1, wherein the validation email comprises a unique login key.

5. The mobile wireless communications device according to claim 4, wherein said controller is configured to extract the unique login key from the validation email.

6. The mobile wireless communications device according to claim 4, wherein said controller is configured to validate the application based upon wirelessly sending the unique login key back to the validation server.

7. The mobile wireless communications device according to claim 1, further comprising a display coupled to said controller; and wherein said controller is configured to display a password reset input screen based upon the validation email.

8. A communications system comprising:
a validation server configured to send a validation email; and
a mobile wireless communications device operatively coupled to said validation server and comprising a wireless transceiver, and a controller coupled to said wireless transceiver, said controller configured to determine, as part of a user-login process to the mobile wireless communications device, if an email address is associated with the mobile wireless communications device,
wirelessly send a validation request to said validation server based upon the email address, and
wait for the validation email to be wirelessly received from said validation server based upon the validation request if the email address is associated with the wireless communications device, and if the validation email is wirelessly received, then validate access to an application based upon the validation email.

9. The communications system according to claim 8, wherein said controller is configured to discontinue waiting for the validation email, if the validation email is not wirelessly received prior to a user-input override.

10. The communications system according to claim 8, wherein the validation email comprises a unique login key.

11. The communications system according to claim 10, wherein said controller is configured to extract the unique login key from the validation email.

12. The communications system according to claim 10, wherein said controller is configured to validate the application based upon wirelessly sending the unique login key back to said validation server.

13. A method of validating an application on a mobile wireless communications device comprising:
 determining, as part of a user-login process to the mobile wireless communications device, if an email address is associated with the mobile wireless communications device;
 wirelessly sending a validation request to a validation server based upon the email address; and
 waiting for a validation email to be wirelessly received from the validation server based upon the validation request if the email address is associated with the wireless communications device, and if the validation email is wirelessly received, then validate the application based upon the validation email.

14. The method according to claim 13, wherein further comprising discontinuing waiting for the validation email, if the validation email is not wirelessly received within a predetermined time.

15. The method according to claim 13, further comprising discontinuing waiting for the validation email, if the validation email is not wirelessly received prior to a user-input override.

16. The method according to claim 13, wherein the validation email comprises a unique login key.

17. The method according to claim 16, wherein further comprising extracting the unique login key from the validation email.

18. The method according to claim 16, further comprising validating the application based upon wirelessly sending the unique login key back to the validation server.

19. The method according to claim 13 further comprising wirelessly receiving a notification message from the validation server that the validation email has been wirelessly sent and displaying the notification message on a display.

20. The method according to claim 19, further comprising displaying a password reset input screen based upon the validation email.

21. A non-transitory computer-readable medium for validating an application on a mobile wireless communications device, the non-transitory computer-readable medium having computer-executable instructions for causing the mobile wireless communications device to perform steps comprising:
 determining, as part of a user-login process to the mobile wireless communications device, if an email address is associated with the mobile wireless communications device;
 wirelessly sending a validation request to a validation server based upon the email address; and
 waiting for a validation email to be wirelessly received from the validation server based upon the validation request if the email address is associated with the wireless communications device, and if the validation email is wirelessly received, then validate the application based upon the validation email.

22. The non-transitory computer-readable medium according to claim 21, wherein further comprising discontinuing waiting for the validation email, if the validation email is not wirelessly received within a predetermined time.

23. The non-transitory computer-readable medium according to claim 21, further comprising discontinuing waiting for the validation email, if the validation email is not wirelessly received prior to a user-input override.

24. The non-transitory computer-readable medium according to claim 21, wherein the validation email comprises a unique login key.

25. The non-transitory computer-readable medium according to claim 24, wherein further comprising extracting the unique login key from the validation email.

26. The non-transitory computer-readable medium according to claim 24, further comprising validating the application based upon wirelessly sending the unique login key back to the validation server.

27. The non-transitory computer-readable medium according to claim 21 further comprising wirelessly receiving a notification message from the validation server that the validation email has been wirelessly sent and displaying the notification message on a display.

28. The method according to claim 27, further comprising displaying a password reset input screen based upon the validation email.

* * * * *